July 18, 1961 W. M. WALKER 2,992,566
TRANSMISSION ASSEMBLY
Filed March 14, 1960 2 Sheets-Sheet 1
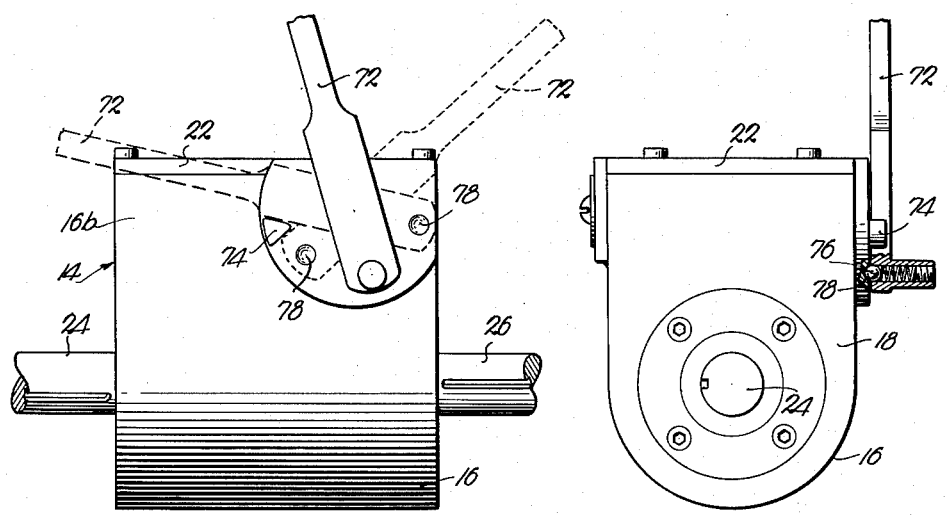
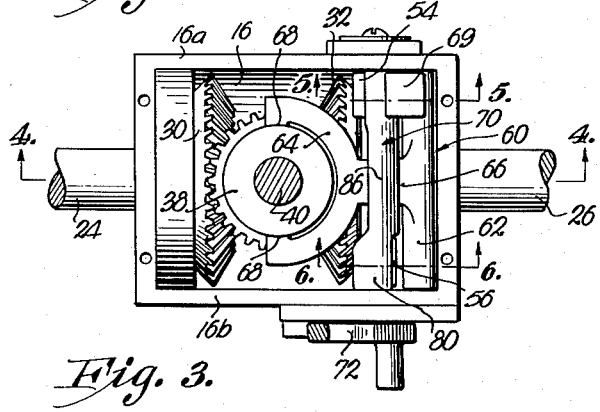
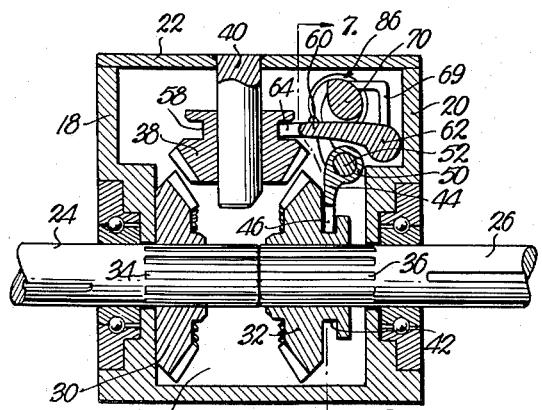
INVENTOR.
Wesley Max Walker
BY
Hovey, Schmidt, Johnson & Hovey
ATTORNEYS.

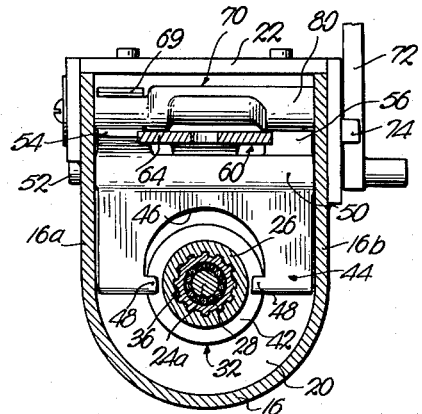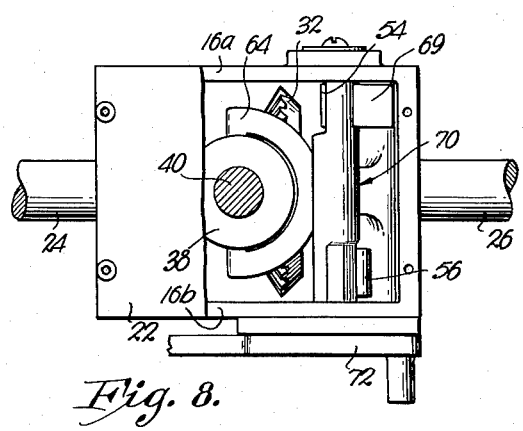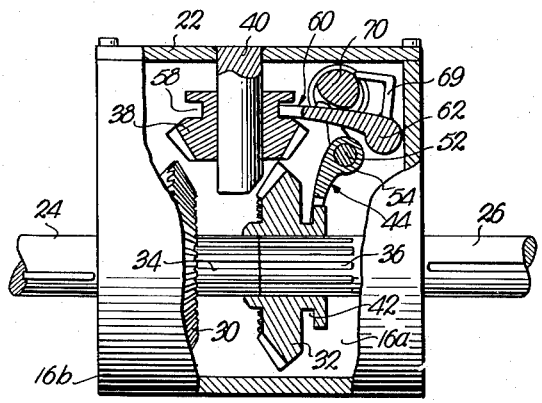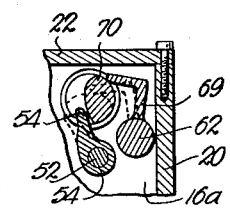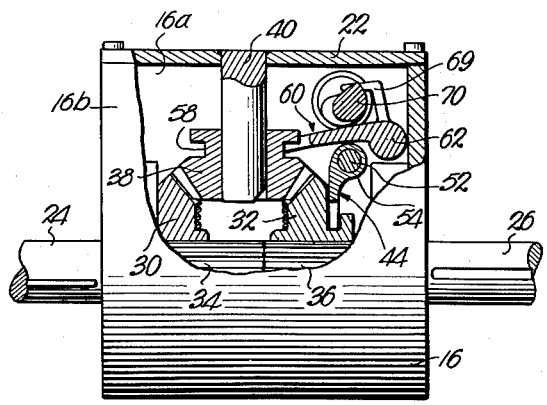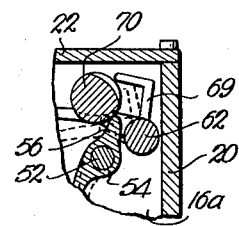

United States Patent Office 2,992,566
Patented July 18, 1961

2,992,566
TRANSMISSION ASSEMBLY
Wesley Max Walker, Fowler, Kans.
Filed Mar. 14, 1960, Ser. No. 14,652
10 Claims. (Cl. 74—355)

This invention relates to an improved transmission assembly and has for its primary object the provision of a simple, compact, rugged, inexpensive arrangement wherein a pair of end-to-end axially aligned shafts may be easily and quickly interconnected for rotation together in one direction upon swinging of an actuating device in one direction from neutral, and wherein such shafts are interconnected by an idler gear for rotation in the opposite direction when the device is swung from neutral in the opposite direction.

Another important object of the present invention is to provide a transmission assembly which, as above indicated, necessitates placing the aforementioned idler gear in meshing relationship to gears on the drive shaft and driven shaft only when the driven shaft is to be rotated in reverse, forward rotation of the driven shaft being effectuated without use of the idler gear.

A further important object of the instant invention is the provision of a transmission assembly employing but a single rotatable, actuating element with associated cams for swinging a pair of fork members that in turn control the said idler gear, as well as one of the gears on one of the shafts so as to effectuate forward and reverse rotation of the other shaft.

Still another object of the present invention is to provide an arrangement of the aforementioned character that has the gears, the fork members, the cams, the actuating element, and certain fingers and ears arranged in an unusually compact manner so that all of such parts may be housed in a relatively small case.

In the drawings:

FIG. 1 is a side elevational view of a transmission assembly made pursuant to my present invention, illustrating the several positions of the swingable actuating device.

FIG. 2 is an end elevational view thereof, parts being broken away for clearness.

FIG. 3 is a plan view showing the cover plate of the case entirely removed.

FIG. 4 is a cross-sectional view taken on line 4—4 of FIG. 3.

FIG. 5 is a fragmentary, detailed, cross-sectional view taken on line 5—5 of FIG. 3.

FIG. 6 is a fragmentary, detailed, cross-sectional view taken on line 6—6 of FIG. 3.

FIG. 7 is a cross-sectional view taken on line 7—7 of FIG. 4.

In FIGS. 1–7 the transmission is shown in a neutral position.

FIG. 8 is a plan view similar to FIG. 3 with the cover plate broken away showing the position of the parts when the driven shaft is coupled to rotate forwardly.

FIG. 9 is a side elevational view partially broken away and in section similar to FIG. 4, the driven shaft being coupled for forward rotation.

FIG. 10 is a view similar to FIG. 9, the driven shaft being coupled for reverse rotation.

FIG. 11 is a fragmentary, detailed, cross-sectional view similar to FIG. 5 showing the position of parts in full lines when the driven shaft rotates forwardly, and dash lines when the driven shaft rotates in reverse; and FIG. 12 is a fragmentary, detailed, cross-sectional view similar to FIG. 6 showing the position of certain parts in full lines when the driven shaft is rotating forwardly, and dash lines when the driven shaft is rotated in reverse.

The transmission assembly illustrated in the drawings has virtually all of its components housed within a case 14, provided with continuous side wall 16, a pair of end walls 18 and 20, and a removable top plate 22.

One shaft 24 which may be adapted to be driven, is journalled in wall 18, and the other shaft 26 illustrated in the drawings, may constitute a drive shaft and is journalled in wall 20, it being noted that the pair of shafts 24 and 26 are in end-to-end, axial alignment and abutting relationship. As seen in FIG. 7, the shaft 24 is provided with a reduced end portion 24a that extends into the shaft 26 and is surrounded by needle bearings 28. Hence, shaft 26 may be driven continuously whether or not shaft 24 is operably coupled therewith.

A first bevel gear 30 is made fast or rigid to shaft 24 for rotation therewith in any suitable manner. A second bevel gear 32 in opposed relationship to gear 30, is adapted for rotation with the shafts 24 and 26 and axial shifting with respect thereto. To this end, splines 34 and 36 are formed on shafts 24 and 26 respectively, and the gear 32 is internally splined complementally therewith as illustrated in FIG. 7.

A third bevel gear 38 is freely rotatable on a stub shaft 40 and shiftable vertically along shaft 40 toward and away from the shafts 24 and 26. Shaft 40 is rigid to the plate 22 and depends therefrom; hence, shaft 40 is shown in cross section in FIGS. 3 and 8, notwithstanding the fact that removal of the plate 22 lifts the shaft 40 away from gear 38.

A first annular groove 42 is formed in the gear 32 to receive a first fork member 44 that spans the distance between sides 16a and 16b of wall 16 as shown best in FIG. 7. More particularly, the fork member 44 is in the nature of a plate having a cutaway 46 for clearing groove 42 and a pair of diametrically opposed studs 48 extending loosely into the groove 42. The upper end of the fork member 44 has a barrel 50 journalled on a cross shaft 52 between sides 16a and 16b, rendering the fork member 44 swingable toward and away from the wall 20. A pair of spaced fingers 54 and 56, integral with the barrel 50, extend upwardly from the latter and, therefore, laterally from the axis of swinging movement of the fork member 44 about the shaft 52.

A second annular groove 58 formed in the third gear 38, receives a second actuating fork member 60 that has a crosspiece 62 journalled in the sides 16a and 16b adjacent the barrel 50, the fork member 60 being, therefore, vertically swingable about an axis that is parallel with the axis of horizontal swinging movement of the fork member 44. A C-shaped yoke 64 forming a part of the fork member 60 is integrally connected with the crosspiece 62 by a central bar 66. Diametrically opposed studs 68, integral with yoke 64, fit loosely in groove 58, an L-shaped ear 69 integral with crosspiece 62 extending upwardly and thence laterally therefrom adjacent finger 54.

A rotatable, actuating element 70 journalled in sides 16a and 16b above shaft 52 and in parallelism therewith, extends outwardly beyond side 16b and is rigid to a swingable device 72 for rotating the element 70. A stop 74 on the side 16b, limits the extent of swinging movement of the device 72 as seen in FIG. 1. A spring-loaded detent 76, carried by the device 72, selectively engages in three indentations to yieldably hold the device 72 in any one of the three positions shown in FIG. 1, said indentations all being designated by the numeral 78.

The element 70 is provided with a pair of cams 80 and 82 for actuating fork 44, and a pair of cams 84 and 86 for actuating fork 60. The first cam 80 engages the first finger 56 to swing the latter toward the crosspiece 62, as shown in FIG. 12, when the device 72 is swung from the neutral position shown by full lines in FIG. 1 anticlockwise against stop 74 to the dash line position depicted in FIG. 1. Such movement of finger 56 causes the fork 44 to swing clockwise, viewing FIG. 4, to the position shown in FIG. 9 where gear 32 is placed into interconnecting, bridged relationship to shafts 24 and 26.

When the device 72 is swung back to the full-line position shown in FIG. 1, element 70 rotates to cause the second cam 82 to act on the second finger 54, swinging the latter away from crosspiece 62 as shown in FIG. 5, thereby swinging the fork member 44 toward wall 20. This retracks the gear 32 back to the position shown in FIG. 4 and the transmission assembly is again in neutral.

The third cam 84 engages the ear 69 thereabove to rotate the cross member 62 clockwise as shown in FIG. 11, when the device 72 is swung anticlockwise from the full-line position illustrated in FIG. 1.

Finally, the fourth cam 86 engages the bar 66, forcing it downwardly when device 72 is swung clockwise from the neutral position illustrated by full lines in FIG. 1.

Downward movement of the bar 66 and, therefore, the yoke 64, shifts the gear 38 downwardly along the shaft 40 to the position illustrated in FIG. 10 between the gears 30 and 32 in meshing relationship thereto, thereby establishing an operable connection between shafts 24 and 26.

Assuming shaft 26 rotates continuously in one direction, the shaft 24 will rotate therewith in the same direction when gear 32 interconnects the shafts 24 and 26 as shown in FIG. 9. However, when the gear 38 establishes the interconnection between shafts 24 and 26, the shaft 24 will rotate oppositely to shaft 26.

Noteworthy is the fact that when device 72 is swung anticlockwise, viewing FIG. 1, toward the full-line position, gear 32 remains stationary until gear 38 has risen to the position shown in FIG. 4. Thereupon, as anticlockwise swinging of device 72 is continued, gear 32 commences to move to the position shown in FIG. 9. Simultaneously, the gear 38 continues to rise until it reaches the upper end of its path of travel as shown in FIG. 9, clearing gear 32.

Conversely, as gear 32 is retracted back to the position shown in FIG. 4, the gear 38 descends to the position shown in FIG. 4. But, when the device 72 is then swung to the right to the dotted-line position in FIG. 1, placing the transmission in reverse, gear 32 remains stationary, i.e., in the position shown in FIGS. 4 and 10.

Cam 80 constitutes an arcuate portion of element 70 adjacent the wall 16b, and cam 86 is likewise in the nature of an arcuate portion of the element 70 intermediate the ends of the latter, cams 80 and 86 being circumferentially offset. Cams 82 and 84 on the other hand, are adjacent the wall 16a and constitute an arcuate portion of the element 70 that is circumferentially offset with respect to the cam 86.

Having thus described the invention what is claimed as new and desired to be secured by Letters Patent is:

1. A transmission assembly comprising a pair of shafts in end-to-end, axial alignment; a first gear rigid to one of the shafts; a second gear mounted on the other shaft for rotation therewith, said second gear having a first annular groove and being shiftable axially of the shafts toward and away from said first gear to and from a position bridging the shafts and interconnecting the same for rotation together; a third gear having a second annular groove, said third gear being rotatable about an axis perpendicular to the axes of rotation of the shafts, and being shiftable along its axis of rotation toward and away from the shafts to and from a position meshing with the first and second gears when the second gear is shifted away from the first gear out of interconnecting relationship to the shafts; a first movable fork member engageable in said first groove for shifting said second gear; and a second movable fork member engageable in said second groove for shifting said third gear; and rotatable cam means engageable with the first and second fork members for shifting said second gear toward said first gear and said third gear away from said shafts when said means is rotated in one direction and for shifting said second gear away from said first gear and said third gear toward said shafts when said means is rotated in the opposite direction.

2. A transmission assembly comprising a pair of shafts in end-to-end, axial alignment; a first gear rigid to one of the shafts; a second gear mounted on the other shaft for rotation therewith, said second gear having a first annular groove and being shiftable axially of the shafts toward and away from said first gear to and from a position bridging the shafts and interconnecting the same for rotation together; a third gear having a second annular groove, said third gear being rotatable about an axis perpendicular to the axes of rotation of the shafts, and being shiftable along its axis of rotation toward and away from the shafts to and from a position meshing with the first and second gears when the second gear is shifted away from the first gear out of interconnecting relationship to the shafts; a first movable fork member engageable in said first groove for shifting said second gear; a second movable fork member engageable in said second groove for shifting said third gear; and a rotatable actuating element having a first cam engageable with the first fork member to move the latter in one direction and shift the second gear toward the first gear when said element is rotated in one direction and when said third gear is shifted away from said shafts, and a second cam engageable with the first fork member to move the latter in the opposite direction and shift the second gear away from the first gear when said element is rotated in the opposite direction and when said third gear is shifted toward said shafts.

3. The invention of claim 2, said first fork member being swingable and having a first finger extending laterally from its axis of swinging movement and engageable with said first cam, and a second finger extending laterally from its axis of swinging movement and engageable with said second cam.

4. A transmission assembly comprising a pair of shafts in end-to-end, axial alignment; a first gear rigid to one of the shafts; a second gear mounted on the other shaft for rotation therewith, said second gear having a first annular groove and being shiftable axially of the shafts toward and away from said first gear to and from a position bridging the shafts and interconnecting the same for rotation together; a third gear having a second annular groove, said third gear being rotatable about an axis perpendicular to the axes of rotation of the shafts, and being shiftable along its axis of rotation toward and away from the shafts to and from a position meshing with the first and second gears when the second gear is shifted away from the first gear out of interconnecting relationship to the shafts; a first movable fork member engageable in said first groove for shifting said second gear; a second movable fork member engageable in said second groove for shifting said third gear; and a rotatable actuating element having a first cam engageable with the second fork member to move the latter in one direction and shift the third gear away from the shafts when said element is rotated in one direction and when said second gear is shifted toward said first gear, and a second cam engageable with the second fork member to move the latter in the opposite direction and shift the third gear toward the shafts when said element is rotated in the opposite direction and when said gear is shifted away from said first gear.

5. The invention of claim 4, said second fork member being swingable and having an ear secured thereto and spaced from its axis of swinging movement, said ear being engageable with said first cam to swing said second fork member upon rotation of said element.

6. A transmission assembly comprising a pair of shafts in end-to-end, axial alignment; a first gear rigid to one of the shafts; a second gear mounted on the other shaft for rotation therewith, said second gear having a first annular groove and being shiftable axially of the shafts toward and away from said first gear to and from a position bridging the shafts and interconnecting the same for rotation together; a third gear having a second annular groove, said third gear being rotatable about an axis perpendicular to the axes of rotation of the shafts, and being shiftable along its axis of rotation toward and away from the shafts to and from a position meshing with the first and second gears when the second gear is shifted away from the first gear out of interconnecting relationship to the shafts; a first movable fork member engageable in said first groove for shifting said second gear; a second movable fork member engageable in said second groove for shifting said third gear; and a rotatable actuating element having a first cam engageable with the first fork member to move the latter in one direction and shift the second gear toward the first gear when said element is rotated in one direction, a second cam engageable with the first fork member to move the latter in the opposite direction and shift the second gear away from the first gear when said element is rotated in the opposite direction, a third cam engageable with the second fork member to move the latter in one direction and shift the third gear away from the shafts when said element is rotated in said one direction, and a fourth cam engageable with the second fork member to move the latter in the opposite direction and shift the third gear toward the shafts when said element is rotated in said opposite direction.

7. The invention of claim 6, said second fork member being swingable and having an ear secured thereto and spaced from its axis of swinging movement, said ear being engageable with said third cam to swing said second fork member upon rotation of said element.

8. The invention of claim 6, wherein is provided a swingable device on the element spaced from the cams thereon for rotating the latter and thereby said fork members, and wherein the second gear is out of interconnecting relationship to the shafts and the third gear is out of meshing relationship with the first and second gears when said device is intermediate the ends of its path of swinging movement.

9. The invention of claim 6, wherein the said third gear is shifted continuously during rotation of said element and wherein said second gear is shifted only during rotation of the actuating element between one terminal position thereof and an intermediate position thereof.

10. The invention of claim 6, said first fork member being swingable and having a first finger extending laterally from its axis of swinging movement and engageable with said first cam, and a second finger extending laterally from its axis of swinging movement and engageable with said second cam.

References Cited in the file of this patent

UNITED STATES PATENTS

| | | |
|---|---|---|
| 1,394,373 | Tellefsen | Oct. 18, 1921 |
| 2,575,379 | Benning | Nov. 20, 1951 |
| 2,850,130 | Mater | Sept. 2, 1958 |